Aug. 15, 1950     C. E. BLOMGREN     2,519,104
NONSNAG SINKER FOR FISHING LINES
Filed July 18, 1947
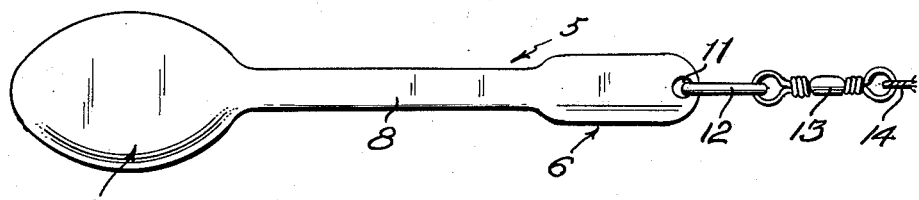
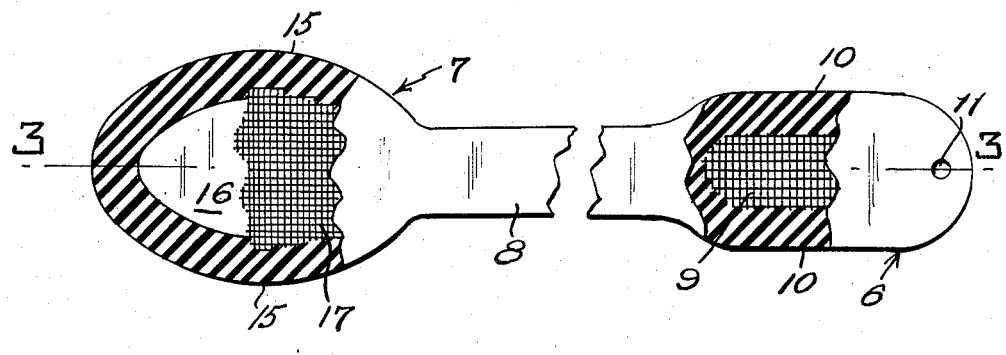
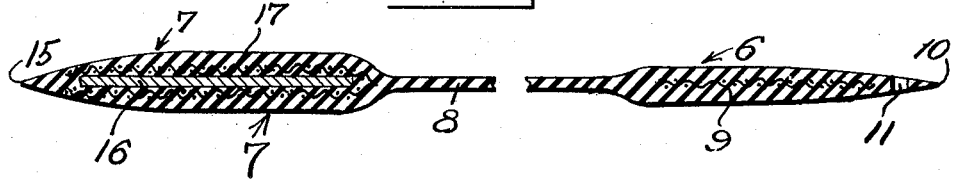
Inventor
Carl E. Blomgren
By *Randolph & Beavers*
Attorneys Patented Aug. 15, 1950

2,519,104

UNITED STATES PATENT OFFICE 2,519,104

NONSNAG SINKER FOR FISHING LINES

Carl E. Blomgren, Chicago, Ill., assignor of one-half to Edith Olga Blomgren, Chicago, Ill.

Application July 18, 1947, Serial No. 761,957

7 Claims. (Cl. 43—43.1)

This invention relates to an improved construction of sinker for use in fishing and which is especially adaptable for trolling.

A primary object of the present invention is to provide a sinker capable of being employed to afford a free action through the water, when in use, whether a mud, snag or rock bottom exists and which can be readily disengaged from an obstruction.

More particularly, it is an object of the present invention to provide an elastic and resilient sinker which may be disengaged from obstructions by exerting a pull and sudden release thereupon to cause the elastic body of the sinker to rebound and in this manner disengage itself from the obstruction.

Still a further object of the invention is to provide a sinker which will offer a minimum of resistance in being pulled through the water and which includes a deformable weighted portion capable of being manually shaped by the user for imparting various actions to the sinker and to a bait employed therewith when drawn through the water and which may also be utilized to vary the depth at which the sinker will travel through the water.

Various other objects and advantages of the invention will hereinafter become more fully apparent from the following description of the drawing, illustrating a preferred embodiment thereof, and wherein:

Figure 1 is a plan view of the sinker;

Figure 2 is an enlarged fragmentary plan view, partly broken away to show the interior construction thereof; and Figure 3 is a longitudinal sectional view taken substantially along a plane as indicated by the line 3—3 of Figure 2.

Referring more specifically to the drawing, the nonsnag sinker in its entirety is designated generally 5 and includes a head portion 6 at one end thereof, a tail 7 at its opposite end and an intermediate body portion 8 connecting the head and tail.

The head 6 is oval shaped in plan and is formed of a flexible material, such as rubber, having a strip of mesh wire fabric 9 molded therein and with the edges thereof spaced from the marginal edges 10 of the head 6, as best seen in Figure 2. The head 6 diminishes in thickness toward its outer or leading end and toward its side edges so that the edges 10 thereof are feathered, as clearly illustrated in Figure 3. The head 10 is provided with an opening 11, disposed substantially in alignment with the longitudinal axis of the sinker 5 and adjacent its leading end for receiving a ring or other means 12 by which a swivel 13, connected to a fishing line or leader 14, may be attached to the sinker 5, or the swivel 13 or fishing line or leader 14 could be attached directly to the opening 11.

The tail 7 which is preferably longer and wider than the head 6 is likewise formed of an elastic, molded material, such as rubber, and is likewise oval in shape and with the side edges 15 thereof preferably being arcuate and convex throughout their length. The tail 7 has a weighted plate 16 of a readily deformable material such as lead molded therein and between strips of mesh wire fabric 17 which are likewise molded into the tail 7 and as clearly illustrated in Figure 2, the plate 16 and mesh wire fabric strips 17 are of substantially the same shape as the tail 7 but smaller so as to have their side edges spaced from the side edges 15 of said tail, and like the head 6, the thickness of the tail 7 diminishes toward its side edges and ends so that the side edges 15 and the outer, trailing end formed thereby, are likewise feathered, as seen in Figure 3.

The intermediate body portion 8 which forms a connection between the head 6 and tail 7 is formed of a resilient material such as rubber and may be vulcanized adjacent its ends to the adjacent ends of the head and tail or may be molded integral therewith to afford an elastic connection between the head and tail. The body 8 is preferably substantially narrower than the tail 7 and of a width less than that of the head 6 and is also preferably of a length greater than the head or tail.

A bait, lure or fish hook, not shown, may be attached in any desired manner to the line or leader 14, ring 12 or the tail 7, adjacent its trailing end, may be provided with an opening similar to the opening 11 for attachment of the bait, lure or fish hook thereto, usually through a leader interposed therebetween, not shown.

It will be readily apparent that the mesh wire fabric 9 will reinforce the head 6 to cause it to maintain substantially the shape as shown when in use and the weighted plate 16 and mesh wire fabric 17 will likewise reinforce the tail 7 and the lead plate 16 will also function as a weight for maintaining the sinker in a submerged position while being drawn through the water. Likewise, the plate 16 being formed of a soft metal, such as lead, may be manually deformed for varying the shape of the tail 7 to cause the sinker 5 to execute various actions while being drawn through the water and to thereby vary the action or movement of a bait or lure connected thereto and to also vary the depth at which the sinker will travel through the water when moving at a given speed.

Likewise, the shape of the sinker 5 will cause it to pass over or around snags or other obstructions and should the sinker become snagged, a sudden pull and release on the line attached thereto will cause the sinker to rebound, due to the resiliency of the material from which it is formed and especially due to the resiliency of the body 8, to cause the sinker to thereby disengage itself from the obstruction or snag.

The mesh wire fabric 9 and 17 may be formed of any suitable material such as copper or aluminum wire mesh.

Various modifications and changes in the preferred embodiment of the invention as disclosed are contemplated and may obviously be resorted to, without departing from the spirit or scope of the invention as hereinafter defined by the appended claims.

I claim as my invention:

1. In a fishing sinker formed of a resilient material, an elongated head containing reinforcing means, an elongated tail containing reinforcing and weighting means, and an elongated body portion interposed therebetween and resiliently connecting the head and tail and maintaining the reinforcing means of the head and tail in spaced relationship.

2. A sinker as in claim 1, said head and tail being wider than the intermediate body portion.

3. A sinker as in claim 1, said head and tail being wider than the intermediate body portion and being generally oval-shaped.

4. A sinker as in claim 1, said head and tail being wider than the intermediate body portion, and said tail being wider and longer than the head and generally oval-shaped in top plan.

5. A fishing sinker comprising an elongated body formed of a resilient material having a laterally enlarged end defining a tail portion, and a weight molded only into said tail portion, the opposite end of the body being provided with a fishing line or leader engaging eye and being remotely disposed to the tail portion.

6. A fishing sinker as in claim 5, said weight being of a material manually deformable to vary the shape of the tail portion.

7. A fishing sinker comprising an elongated body formed of a resilient material, a weight disposed within one end only of said elongated body, the opposite end of the body being adapted to be connected to a fishing line or leader, said body including an elongated limber portion interposed between the ends of the body and providing an elastic, longitudinally stretchable connecting portion between the ends of the body whereby said ends may assume various spaced positions relatively to each other in use.

CARL E. BLOMGREN.

REFERENCES CITED

The following references are of record in the file of this patent:

UNITED STATES PATENTS

| Number | Name | Date |
|---|---|---|
| 1,450,798 | Filipowski | Apr. 3, 1923 |
| 1,777,004 | Lemere et al. | Sept. 30, 1930 |
| 2,149,464 | Potts | Mar. 7, 1939 |
| 2,311,985 | Hedden | Feb. 23, 1943 |

FOREIGN PATENTS

| Number | Country | Date |
|---|---|---|
| 281,100 | Great Britain | Dec. 1, 1927 |